J. J. GILL.

GLASS HOUSE FURNACE.

No. 9,950. Reissued Nov. 29, 1881.

Witnesses
C. L. Parker
R. H. Whitlesey

Inventor Joseph J. Gill
By Attorney George H. Christy.

UNITED STATES PATENT OFFICE.

JOSEPH J. GILL, OF STEUBENVILLE, OHIO.

GLASS-HOUSE FURNACE.

SPECIFICATION forming part of Reissued Letters Patent No. 9,950, dated November 29, 1881.

Original No. 224,896, dated February 24, 1880. Application for reissue filed November 3, 1881.

*To all whom it may concern:*

Be it known that I, JOSEPH J. GILL, of Steubenville, county of Jefferson, State of Ohio, have invented or discovered a new and useful Improvement in Glass-House Furnaces; and I do hereby declare the following to be a full, clear, concise, and exact description thereof, reference being had to the accompanying drawings, making a part of this specification, in which—like letters indicating like parts—

Figure 1:
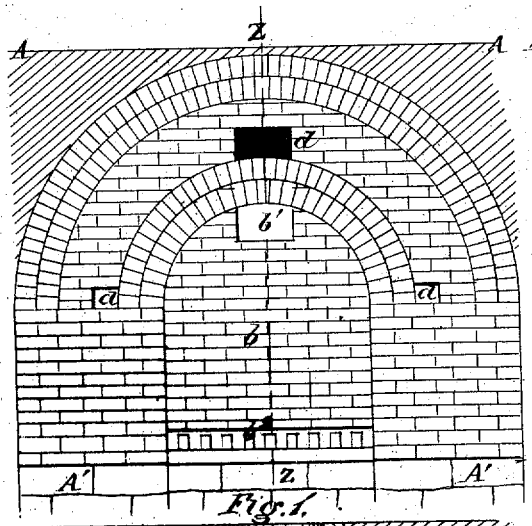
Figure 2:
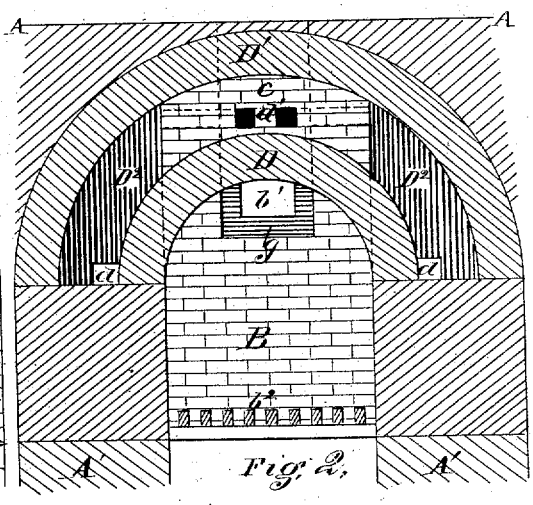
Figure 3:
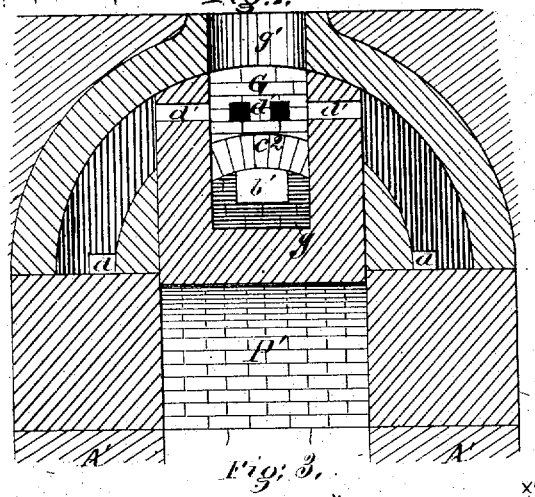
Figure 5:
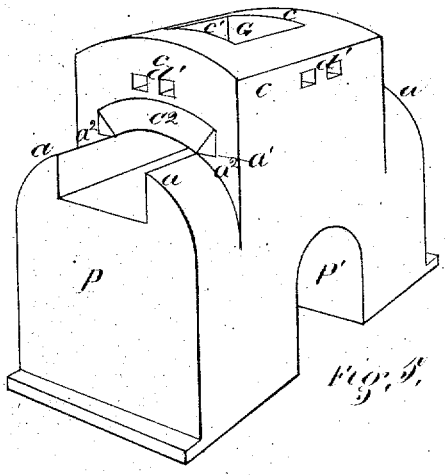
Figure 4:
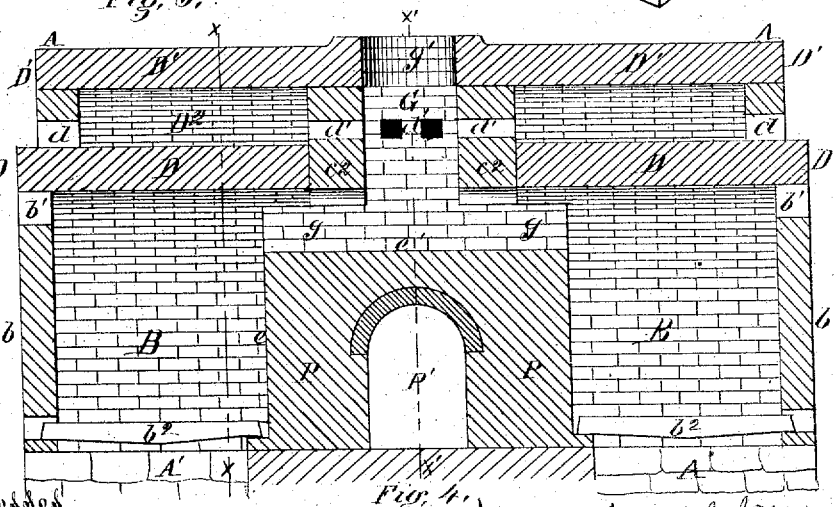

Figure 1 is an end view or elevation of so much of a gas-burning glass-house furnace as is necessary for present purposes of illustration. Fig. 2 is a transverse vertical sectional view of my improved furnace in the plane of the line *x x*, Fig. 4. Fig. 3 is a like view in the plane of the line *x′ x′*, Fig. 4. Fig. 4 is a longitudinal vertical section in the plane of the line *z z*, Fig. 1; and Fig. 5 is a detached view, in perspective, of the central pier.

While some or all of the novel features herein described are applicable to gas-burning furnaces generally, and all such uses of them are hereby included within the scope of the present invention, I have, for convenience, illustrated them as applied to a glass-house furnace, where A represents a portion of the bench on which the pots rest, beneath the usual dome or arch. Also, the furnace is to be erected on raised foundations A′, so as to provide the usual ash-pit or cave below the grate-bars.

At B B, I have shown two gas-producers, which may be of any suitable construction with reference to driving off from fuel therein combustible gases and vapors at a comparatively high temperature. A feed or stoke hole is shown at *b′* in the ends *b* of the producers, and grate-bars at $b^2$, all of any approved construction. These gas-producing chambers are covered each by an arched roof, D. From each producer a flue, *g*, leads to a combustion-chamber, G, which, at its upper end, opens, by the usual eye, *g′*, onto the bench, or leads to other places where the heat is to be used. Over each producer I carry up a second arch, D′, but at such distance above the first arches, D, as to leave room for an air-chamber, $D^2$, which is designed for use both as an air-heating chamber and as an air-conduit flue, so that air admitted either at the ends or sides of the arch at one or more openings, *d*, may come in contact with the entire upper surface of the lower arch, D, be heated by such contact, and, being raised to a high temperature, may pass through the openings *d′* to the combustion-chamber G, where, mingling with the gases and vapors received from the producers, a vivid combustion takes place with the evolution of intense heat. The holes or openings *d d′* may be made in any desired number or order, but preferably they are each of small area, and are distributed substantially as shown, the holes *d′* being arranged on all sides of the combustion-chamber.

Heretofore furnaces of this class have commonly been built with several separate air-conduit flues for conducting the air from without to the combustion-chamber, which flues were divided one from another by intervening or partition walls built in the space between the arch over the producer and the bench above; or, in other words, this space was built or filled solid with masonry, with the exception of air-passages through the same for supplying the combustion-chamber. The course or direction of such flues or passages, especially when nearing the combustion-chamber, was in a horizontal plane, with the result, so far as they passed over the producer-arches at all, of being at varying distances from the under surface of such arch, and not only would the air in such passages be unequally heated, but also the producer-arch itself, being backed with masonry of varying thickness, and being unequally subjected to the action of air in the passages or flues above, would be rapidly worn or melted away by the intense heat acting with greatest effect upon such parts of the arch as were backed most heavily or with partition-walls, and such destruction of a part of the arch required frequent renewal of the whole. This destructive action of the heat upon the backed or covered part of the arch is strikingly illustrated where a brick or large lump of clay is left or placed upon the dome or crown of a reverberatory glass-melting furnace. In such case the fire or heat will cut or melt out a depression or concavity in the dome beneath and corresponding in outline to such brick or lump; but this destructive action of the heat is still further accelerated in the old construction of furnace by reason of the fact that the partition-walls between or around the air-flues acted as conductors to transmit the intense heat above the bench to the upper side of the producer-arch, thus subjecting it to the destructive action of the heat both on its upper and lower surfaces along the lines of such partition-walls.

A part of my invention relates to features of construction by means of which I obviate or avoid those objectionable features which have existed in prior furnaces of this class. This I do by making the producer-arches D of substantially equal thickness throughout, so as to be acted on uniformly by the heat on the under side and the air above; also, by means of the continuous or common air-chamber $D^2$, which dispenses with the partition-walls above referred to, and the consequent unequal backing of the arches D; also, such air-chamber serves as an insulator to arrest the passage or conduction of heat from the bench to the upper surface of the producer-arches. It secures steady and uniform heating of the air to be supplied to the combustion-chamber. It affords a large area of contact-surface, whereby the air is brought to a very high temperature before entering the combustion-chamber, without, on the other hand, materially lessening the temperature within the producers, and yet affords uniform protection to the exposed part of the upper surfaces of arches D by preventing such arches from becoming so excessively hot as to be melted or worn away except after a comparatively long use. I do not wish, however, to limit this part of my invention to an air-chamber which shall extend entirely over the whole of the upper surface of the producer-arches, as it obviously may extend over the greater part of such surface only, or over such part as is exposed to the greatest heat, in which case it need not extend entirely down to a horizontal skew-back, as shown, but may stop a little short of that point on an inclined skew-back; nor need it extend along the entire length of the arch D, but may stop a little short of the outer end, the heat at the extreme outer end not usually being excessive.

Other features of my invention relate to the construction of the central pier, P, and the relation of its parts to the rest of the structure. Transversely across the pier I make an open arch, P′, in order that air circulating freely therein may act to prevent the destructive effects of the heat on the walls *e* and *e′*.

For convenience in building and supporting the arches D, I round off the corners of the pier, as shown at *a a*, the curvature of the parts *a* being the same as that of the under side of the arches resting thereon. The arch may then be renewed without the necessary rebuilding of the pier. But in order to prevent the liability of a leak at the joint of the pier and arch I carry up the central or inner portion of the pier straight, as shown at *a′*, so that the flat vertical face $a^2$ of such raised or squarely-built part shall furnish an abutting-face for the end of the arch and make a tight joint at that point. The square shoulders *a′* also serve as skew-backs for the small supplemental arches $c^2$, which span or cover the flues *g* at their opening into the combustion-chamber. The purpose or function of these arches $c^2$ is twofold. Being short and independently supported, they are less likely to be melted down by the intense heat which necessarily exists at that point, and if injured they can be renewed without tearing down the whole furnace or the arches D; also, they serve to support the center of the side walls, *c*, of the combustion-chamber. These walls *c*, together with the other two walls, *c′*, are built up from and practically are a continuation of the central part of the pier. Flue-openings *d′* in any desired number are made through these walls, as before described. The upper edges of these walls are rounded, so as to conform to the under side of the upper arch, D′, which is built over and covers the combustion-chamber, with the exception of the usual eye, *g′*.

It should be noted that the air-chamber $D^2$ extends entirely around the walls *c c′* of the combustion-chamber, so that the air therein acts as a protective agent to such walls in like manner as to the arches D; and, furthermore, as there are no flue partition walls abutting against the sides of the combustion-chamber, they will withstand the action of the heat much longer than they otherwise would do. Hence the action of the air as a protective agent is practically uniform, not only on the arches D, as already stated, but also on the walls *c c′*.

So far as I am aware it is new with me, in the class of furnaces herein referred to and described as gas-burning furnaces, to construct the furnace with a gas-producer directly under the bench, chamber, or inclosure in which the heat is to be applied with an interposed air-chamber extending over the whole or the greater part of the producer-arch, or over such part of it as is exposed to the greatest heat, and by so doing I render frequent renewal or rebuilding unnecessary, such work being, as will readily be seen, exceedingly difficult and expensive.

I claim herein as my invention—

1. In a gas-burning furnace, a gas-producer arranged directly beneath the bench, chamber, or inclosure where the heat is to be applied, in combination therewith and with an intermediate air-chamber extending over the whole or the greater part of the upper surface of the producer-arch, or over such part as is exposed to the greatest heat, substantially as set forth.

2. The combination of a gas-producer and a double arch over the same, forming an intervening air-chamber, substantially as set forth.

3. In a glass-house furnace, the combination of a gas-producer, a bench arranged over such producer for support of glass-pots, and an air-chamber between the bench and producer extending over the whole or greater part of the arch of the producer, with ports in the walls of such chamber for supply of air thereto, substantially as described, whereby the arch is exposed on its back to the action of air and conduction of heat thereto from the bench is arrested.

4. In combination with a gas-producer, a double arch covering the same and forming an intervening air-chamber extending over the whole or greater part of the producer-arch, with inlet-ports *d* for the supply of air, and exit-ports *d'* leading thence to the combustion-chamber, substantially as set forth.

5. An air-chamber, $D^2$, extending over the producer-arches and around the vertical walls of the combustion-chamber G, substantially as and for the purposes set forth.

6. In a gas-producing and burning furnace, a pier, P, arched at its end, as at *a*, for an arch-support, and squarely built inside such end, as at *a'*, for a support for the walls of the combustion-chamber, substantially as set forth.

7. The combination of pier P, supplemental arches $c^2$, walls *c* and *c'*, and arch or cover D' with eye *g'*, substantially as set forth.

In testimony whereof I have hereunto set my hand.

JOSEPH J. GILL.

Witnesses:
R. H. WHITTLESEY,
C. L. PARKER.